(12) United States Patent
Scarselli (10) Patent No.: US 11,842,249 B2
(45) Date of Patent: Dec. 12, 2023

(54) ASSET VERIFICATION SYSTEM AND METHODS OF USING SAME

(71) Applicant: Bruno Scarselli, New York, NY (US)

(72) Inventor: Bruno Scarselli, New York, NY (US)

( * ) Notice: Subject to any disclaimer, the term of this patent is extended or adjusted under 35 U.S.C. 154(b) by 0 days.

(21) Appl. No.: 17/714,539

(22) Filed: Apr. 6, 2022

(65) Prior Publication Data

US 2022/0318534 A1    Oct. 6, 2022

Related U.S. Application Data

(60) Provisional application No. 63/171,212, filed on Apr. 6, 2021.

(51) Int. Cl.
| | |
|---|---|
| *G06K 9/80* | (2006.01) |
| *G06K 9/36* | (2006.01) |
| *G06K 7/10* | (2006.01) |
| *G06K 7/14* | (2006.01) |

(52) U.S. Cl.
CPC ....... *G06K 7/10831* (2013.01); *G06K 7/1413* (2013.01); *G06K 7/1417* (2013.01)

(58) Field of Classification Search
CPC ............ G06Q 20/3674; G06Q 20/401; G06K 19/06196; G06K 7/1413; G06K 7/1417; G06K 7/1439
USPC ................................ 235/462.1, 462.09, 454
See application file for complete search history.

(56) References Cited

U.S. PATENT DOCUMENTS

| | | | |
|---|---|---|---|
| 5,656,186 A | 8/1997 | Mourou et al. | |
| 6,977,137 B2 | 12/2005 | Borrelli et al. | |
| 9,849,364 B2 | 12/2017 | Tran et al. | |
| 10,201,939 B1* | 2/2019 | Pare ........................ | G05B 15/02 |
| 10,269,009 B1* | 4/2019 | Winklevoss ......... | G06Q 20/105 |
| 10,693,872 B1* | 6/2020 | Larson .................... | G06F 21/31 |
| 2004/0196501 A1 | 10/2004 | Silverbrook et al. | |
| 2008/0149710 A1 | 6/2008 | Silverbrook et al. | |

(Continued)

FOREIGN PATENT DOCUMENTS

| | | |
|---|---|---|
| CA | 2942229 A1 | 3/2019 |
| WO | 2016205336 A1 | 12/2016 |

OTHER PUBLICATIONS

How retailers can deliver diamond security and consumer confidence (Year: 2019).*

(Continued)

*Primary Examiner* — Daniel St Cyr
(74) *Attorney, Agent, or Firm* — Maynard Nexsen PC; Todd Allen Serbin (57) ABSTRACT

An asset verification system, comprising: a reader comprising a holder configured to hold an asset in a tag-reading position, a light source consisting of at least one light to provide illumination to the asset, magnifying optics configured with an effective magnification for both sufficiently separating dots in a tag in the body of the asset and viewing the tag at an effective magnification greater than 10×, reflective optics for conveying an image of the tag through the reader, and, position controls for adjusting the positioning of the asset with respect to the magnifying optics; a multi-function hardware device comprising an optical sensor for reading the tag of the asset projected to the optical sensor by the reader; and, a database having information related to the asset including an association of the tag to the asset stored thereon.

19 Claims, 10 Drawing Sheets

(56) References Cited

U.S. PATENT DOCUMENTS

| | | |
|---|---|---|
| 2013/0175339 A1 | 7/2013 | Svetal |
| 2014/0263634 A1 | 9/2014 | Iqbal et al. |
| 2016/0085955 A1 | 3/2016 | Lerner |
| 2019/0147709 A1* | 5/2019 | Schoner ............... G06Q 20/322 235/383 |
| 2019/0366475 A1 | 12/2019 | Scarselli et al. |
| 2020/0014816 A1* | 1/2020 | Speasl ................ H04N 1/00129 |
| 2021/0073913 A1* | 3/2021 | Ingargiola .............. G06Q 20/02 |

OTHER PUBLICATIONS

ISR dated Jun. 21, 2022.
"Writing waveguides in glass with a femtosecond laser," by Davis et al., Opt. Lett. 21, 1729-1731 (1996).
Skandarajah et al., "Quantitative Imaging with a Mobile Phone Microscope", PLoS One 9(5): e96906, 2014, pp. 1-12, doi:10.1371/journal.pone.0096906.

* cited by examiner

FIG.12

ASSET VERIFICATION SYSTEM AND METHODS OF USING SAME

RELATED APPLICATION

This application claims the benefit of priority under 35 U.S.C. § 119(e) of U.S. Provisional Patent Application No. 63/171,212 filed Apr. 6, 2021, the contents of which are incorporated herein by reference in their entirety.

FIELD OF THE INVENTION

The present invention, in some embodiments thereof, relates to asset verification and, more particularly, but not exclusively, to systems and methods for performing asset verification.

BACKGROUND OF THE INVENTION

Laser direct writing, for example with femtosecond duration laser pulses, define a methodology for generating various types of photonic devices internally in bulk transparent materials, with laser interactions confined in or near the laser focal volume. In this way, three-dimensional (3D) photonic devices may be fabricated. Various types of femtosecond lasers may be used to alter the refractive index of transparent materials, for example, to create buried optical waveguides.

For example, see U.S. Pat. No. 5,656,186 to Mourou, et al., which describes ultrashort laser interactions with materials and "Writing waveguides in glass with a femtosecond laser," by Davis et al, Opt. Lett. 21, 1729-1731 (1996) which discloses a method of forming buried optical waveguides with ultrashort duration lasers. U.S. Pat. No. 6,977,137 to Borrelli et al. discloses femtosecond laser writing of refractive index changes in three dimensions and various devices.

Attempts to make "asset verification" type systems, including readers for laser etched tags, include the Sarine TruMatch diamond verification system, but which has a number of shortcomings, for example it only scans tags on the surface of gems and it outputs a QR/bar code which requires additional scanning by the user. See blog.sarine.com/how-retailers-can-deliver-diamond-security-build-consumer-confidence.

Additional background art includes U.S. Pat. No. 9,849,364 to Tran, et al., CA2942229 to Davies, WO2016/205336 to Kirsch, and US2016/0085955 to Lerner.

SUMMARY OF THE INVENTION

According to an aspect of some embodiments of the present invention there is provided an asset verification system, comprising: a reader comprising a holder configured to hold an asset in a tag-reading position, a light source consisting of at least one light to provide illumination to the asset, magnifying optics configured with an effective magnification for both sufficiently separating dots in a tag in the body of the asset and viewing the tag at an effective magnification greater than 10×, reflective optics for conveying an image of the tag through the reader, and, position controls for adjusting the positioning of the asset with respect to the magnifying optics; a multi-function hardware device comprising an optical sensor for reading the tag of the asset projected to the optical sensor by the reader, wherein the multi-function hardware device is at least one of a tablet, smartphone and a laptop computer; and, a database having information related to the asset including an association of the tag to the asset stored thereon.

In an embodiment of the invention, the system further comprises a device platform provided to the reader for placement of the multi-function hardware thereon.

In an embodiment of the invention, the device platform is adjustable in at least one degree of freedom.

In an embodiment of the invention, the database includes a distributed ledger.

In an embodiment of the invention, the holder orients the asset top-down, towards the light source.

In an embodiment of the invention, the holder is one of a plurality of interchangeable holders.

In an embodiment of the invention, the light source comprises at least one LED.

In an embodiment of the invention, the light source is an array of lights.

In an embodiment of the invention, each light is individually controllable for at least one intensity/luminosity, wavelength, and on/off.

In an embodiment of the invention, the light source has preset modes of operation.

In an embodiment of the invention, the magnifying optics is a combination of at least two of a magnifying lens and an eyepiece and an optical sensor of the multi-function hardware.

In an embodiment of the invention, the reflective optics cause the tag image to follow a folded optical path, which reduces the size of reader.

In an embodiment of the invention, the size of reader is 10-20 cm wide, 5-10 cm deep and 10-15 cm high while weighing under lbs.

In an embodiment of the invention, the position controls are automatically controlled by a controller.

In an embodiment of the invention, the asset is at least one of a gem, a transparent or translucent material, a polymer, a precious stone, a crystal, and a collectible.

According to an aspect of some embodiments of the present invention there is further provided method for using an asset verification system, comprising: placing an asset in a holder of a reader; lighting the asset to cause forward scatter of light through a tag disposed in the body of the asset; magnifying the tag in the asset using magnifying optics; reflecting an image of the tag to an eyepiece, using reflective optics; reading the tag using an optical system of a multi-function hardware device, wherein the multi-function hardware device is at least one of a tablet, smartphone and a laptop computer; processing the tag read by the multi-function hardware; and, gathering information about the asset using a linkage between the tag and the asset stored on a database.

In an embodiment of the invention, the method further comprises moving the asset relative to the magnifying optics using position controls.

In an embodiment of the invention, the method further comprises displaying the gathered information to a user.

According to an aspect of some embodiments of the present invention there is further provided an asset identification, registration, tracking and/or commercialization system, comprising: a tagging unit, configured for laser-etching a tag into a body of an asset, wherein the tag is a physical indicator of at least some information related to the asset; a distributed ledger configured to store at least some information related to the asset, including at least an association of the tag with the asset; and, a reading device comprising an asset verification system for reading the tag and conveying at least some information related to the asset.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings and/or images. With specific reference now to the drawings in detail, it is stressed that the particulars shown are by way of example, are not necessarily to scale and are for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to asset verification and, more particularly, but not exclusively, to systems and methods for performing asset verification.

Before explaining at least one embodiment of the invention in detail, it is to be understood that the invention is not necessarily limited in its application to the details of construction and the arrangement of the components and/or methods set forth in the following description and/or illustrated in the drawings and/or the Example. The invention is capable of other embodiments or of being practiced or carried out in various ways.

It should be understood that the asset verification system described herein is a portion of a more comprehensive asset identification tracking, commercialization and verification ecosystem, which is usable for many different types of assets, but in particular precious stones such as diamonds. The larger ecosystem includes businesses, vendors, suppliers, mining companies, retail stores, financial institutions, insurance companies, logistics/transportation, storage, as examples, and also can involve technological solutions such as laser etching on a nano scale and distributed ledgers (e.g. blockchain). Where terms such as distributed ledger are used, as references in the Summary of Invention section, these functionalities/features are implemented on a combination of hardware (such as a computing platform/server/database with non-volatile storage and/or a data processor and/or controller) and software, in an embodiment of the invention.

The larger ecosystem also includes methodologies (and related hardware) comprising: a) tagging an asset, such as a gem, transparent or translucent material, polymer, precious stone or crystal, or other assets and collectibles, with identifying information, where the tagging comprises modification of the asset's structure at a desired location using a tagging unit; b) registering/recording the identifying information, for example using blockchain technology; c) subsequent reading of the tag/identification using reading device, such as an automated optical reader like a zoom-capable camera, smartphone, mobile device or microscope; d) optionally updating the recorded information, for example by updating the blockchain, based on transactions and/or changes in information relevant to the asset; e) optionally leveraging the integrity/reliability/infallibility of the recorded identifying information of the asset to commercialize and/or otherwise derive benefit from the asset; and wherein many method action steps further include translation/encryption/decryption/processing stages using hardware and/or software.

The tagging of the asset consists of a gentle and localized modification of the asset material through the absorption of a focused laser pulse. The modification is localized to within the focal volume of the lens used to focus the laser Generally, it is conceived that asset recorded blockchain registration information will be read via a reading device, optionally utilizing a cloud-based or Internet-based process, and/or using artificial intelligence (AI), and/or image recognition methods such as described in more detail herein.

Figure 1:
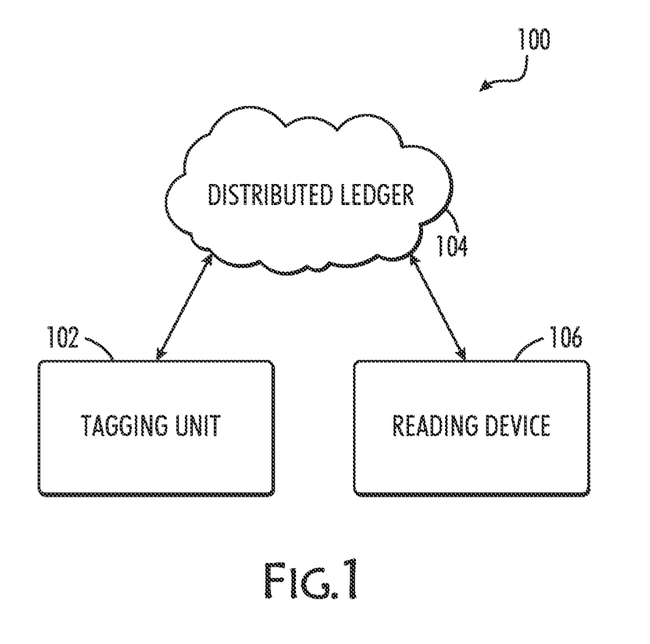
FIG. 1 is a schematic of a system for asset identification, registration, tracking and/or commercialization, in accordance with an embodiment of the invention.

Referring now to the drawings, FIG. 1 is a schematic of a system 100 for asset identification, registration, tracking and/or commercialization, in accordance with an embodiment of the invention, and is provided for context. FIG. 1 of the present application is FIG. 7 from U.S. application Ser. No. 16/429,784. The primary focus of this application is the "Reading Device" 106 of FIG. 1, which is typically referred to as an asset verification system herein but may also be referred to as the reading device (in contrast to "reader" which does not include the multi-functional hardware, as described in more detail below).

To provide additional contextual detail, an asset, such as a gem, transparent or translucent material, polymer, precious stone or crystal, or other collectible, is tagged with identifying information, in an embodiment of the invention. In an embodiment of the invention, this tagging is performed by a tagging unit 102, described in more detail with respect to co-pending U.S. application Ser. No. 16/429,784, configured to modify the structure, or even surface, of the asset using a laser. In some embodiments of the invention, the tag is a two-dimensional area approximately 150μ×150μ, composed of dots in a specific pattern. Optionally, the tag is three-dimensional. The tag is located inside the asset, optionally between 50μ and 1 mm under the surface. The plane of the tag might not be parallel to a/the surface of the asset. The dot pattern can be decoded into a nine digit hex number, which is the unique ID of the gem stone, in some embodiments of the invention.

The tagging unit comprises a laser, using operational parameters such as described herein or in related disclosures such as WO2017/006092, whose operation is directed by a controller and wherein the tagging unit also optionally uses a hardware-based encryption/translation operationally linked to corresponding decryption/translation hardware in the asset verification system 106, described in more detail with respect to FIGS. 2-11, below, wherein the asset verification system 106 is used to read a tag or tags which are previously etched into the asset. In some embodiments, software is used instead of or in addition to hardware-based encryption/translation. In some embodiments of the invention, software is used to provide the various components of the system are programmed to cooperate through software (such as program code, web-based interfaces, mobile app and/or API).

In an embodiment of the invention, the tag serves as a unique serial or identification number for each asset. This serial number in turn serves as an index or lookup value for the database/distributed ledger 104 that may store for example, information from the asset's grading certificate, information about the origin of the asset, ownership information, insurance information, etc., in an embodiment of the invention. In an embodiment of the invention, the tag design represents 68.7 billion unique values using nine dots. Each dot is placed on 1 of 16 locations, in one of 9 zones. In this model, a nine digit hexadecimal number, or 68.7 billion base 10 values, is represented.

In some embodiments, the tags are based on either a 10 micron grid point spacing or 5 micron grid point spacing with tags sizes of 130×130 microns and 65×65 microns, respectively. Information that allows the system 106 to determine this information is programmed into the software. The tags, in some embodiments of the invention, include a set of dots that encode the tag code and a set of dots that encode the tag alignment (and scaling). In an embodiment of the invention, the tag includes two alignment features—one set of 6 equally spaced dots and one orthogonal set of 4 dots with a non-equal spacing. The six dot feature can be used to extract the grid scale and 4 dot feature can be used to extract both the scale and orientation. Note that in some embodiments of the invention, one dot is shared between the six-dot and four-dot features, although the configuration could be different in other tag configurations.

The size and form of the alignment code impacts the overall size of the tag, in some embodiments of the invention. The size and form of the alignment tag may also impact the ease with which a multi-function hardware 204 optical system can recognize if a tag is present and the ease of extracting the required scale and orientation information, as well as tolerance to noise.

The asset verification system 106 is optionally configured with hardware and/or software for decrypting/translating registered identification and/or related information retrieved from a distributed ledger 104 about an asset read/scanned by the asset verification system 106 (reading device and related hardware/software). Additional details regarding tagging and the software for tag reading (for example, as an application installed on multi-function hardware, such as a mobile device/phone/tablet/laptop) is included below.

In some embodiments of the invention and as described in more detail below, the reading device 106 is optically based, for example comprising a microscope, a mobile device (such as at least one camera of a smartphone or even an optical reading device attached to a smartphone or tablet) and/or a zooming camera. In an embodiment of the invention, The reading device 106 could comprise a dedicated, specifically-purposed reader 202 which is used in combination with multi-function hardware 204 programmed with software (e.g. a downloadable and/or installable mobile phone app) such as a tablet, smartphone or other mobile communication device, or laptop computer which enables the reading device 106 to receive input from a scanned asset, process the input, and/or retrieve information regarding that asset. For example, the software optionally programs the multi-purpose hardware with operationally sensitive parameters, such as scanning depth and/or magnification and/or focal distance and/or optical character recognition and/or bar/QR code-type reading and/or which cameras/optical sensors to use, for reading the identification/tag etched into the body of the asset. In some embodiments of the invention, the reader 202 portion of the reading device/asset verification system 106 is sized and/or shaped to be handheld and/or readily portable by hand (a single user). As with the tagging unit 102, in some embodiments certain components are located and/or functions are performed externally to the reader 202, or even asset verification system 106, but for the purposes of this description are still considered as a part of the "reader", "reading device"/"asset verification system".

Additionally, and/or optionally as an added security measure, the reading device's 106 hardware and/or software is operationally corresponded to the tagging unit's 102 identification/information output registered with the distributed ledger such that the reading device's hardware and/or software is required to successfully and/or usefully retrieve the asset's identification/information from the distributed ledger.

Figure 2:
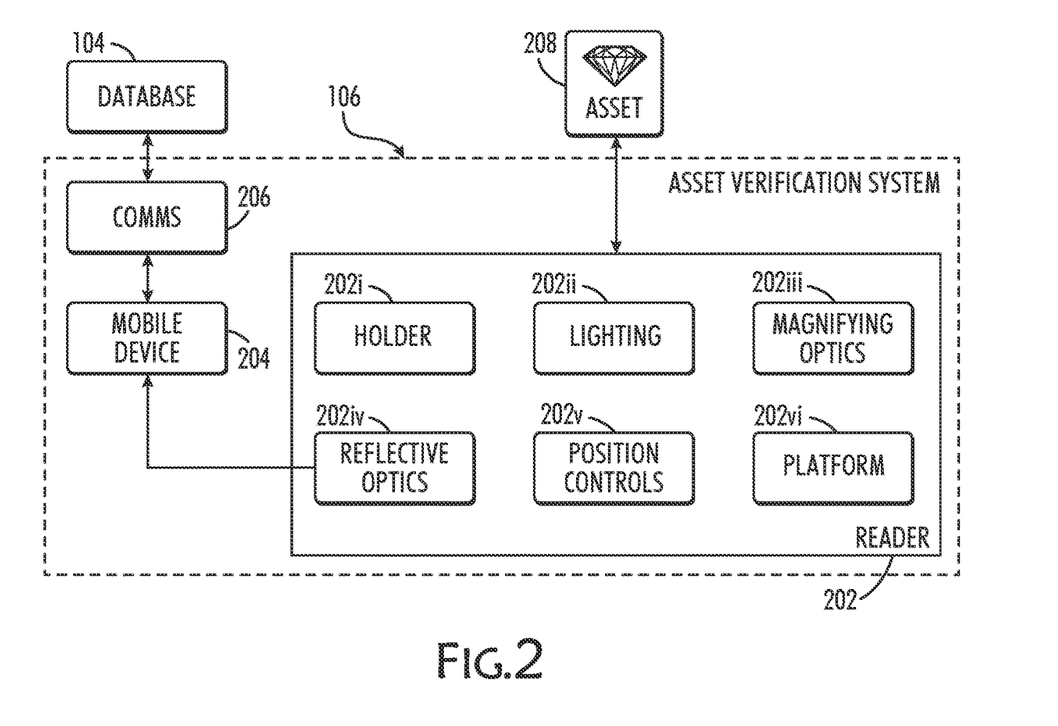
FIG. 2 is a block diagram of an asset verification system, in accordance with an exemplary embodiment of the invention.

Turning now to the asset verification system/reading device in more detail, FIG. 2 is a block diagram of the asset verification system 106, in accordance with an exemplary embodiment of the invention. The actual reader apparatus 202 comprises multiple components including a holder 202i, lighting 202ii, magnifying optics 202iii, reflective optics 202iv, position controls 202v and/or a multi-function hardware platform 202vi, in some embodiments of the invention. In some embodiments of the invention, the reader 202 also includes a power source, for example it is battery powered and/or plugged into a power outlet. As described above, the reader 202 is used in conjunction with software-programmed multi-function hardware 204, such as a mobile device, to perform the reading functionality of the "Reading Device" 106 in the system 100 depicted in FIG. 1.

With respect to the holder 202i, this component of the reader 202 is used primarily to hold an asset 208 being verified, for example an actual gemstone or a piece of jewelry which may have a gem stone affixed thereto. It should be understood that gems and/or the jewelry comes in multiple shapes and/or sizes and/or configurations so, in some embodiments of the invention, a plurality of different holders are used with the reader 202 to accommodate the various assets which could be verified. The holder 202i operates in combination with the lighting 202ii, magnifying optics 202iii and/or the positioning controls 202v to bring the tag within the asset 208 into focus for scanning by the multi-function hardware 204, in an embodiment of the invention. In an embodiment of the invention where a plurality of holders are usable with the reader 202, the plurality represents a system of interchangeable and/or comprehensive holders. In some embodiments, the plurality of holders are "pucks" which are differently pre-configured based on the size and/or shape and/or configuration of the asset being evaluated to properly position the asset, and therefore the tag to be read, in an adequate position to be read by the system 106. In some embodiments, one or more of these different components are automatically operated by the asset verification system 106 (or a controller/programmed hardware thereof) to render the tag in the asset 208 readable. Optionally, one or more of these different components are manually operated to render the tag in the asset 208 readable.

Figure 12:
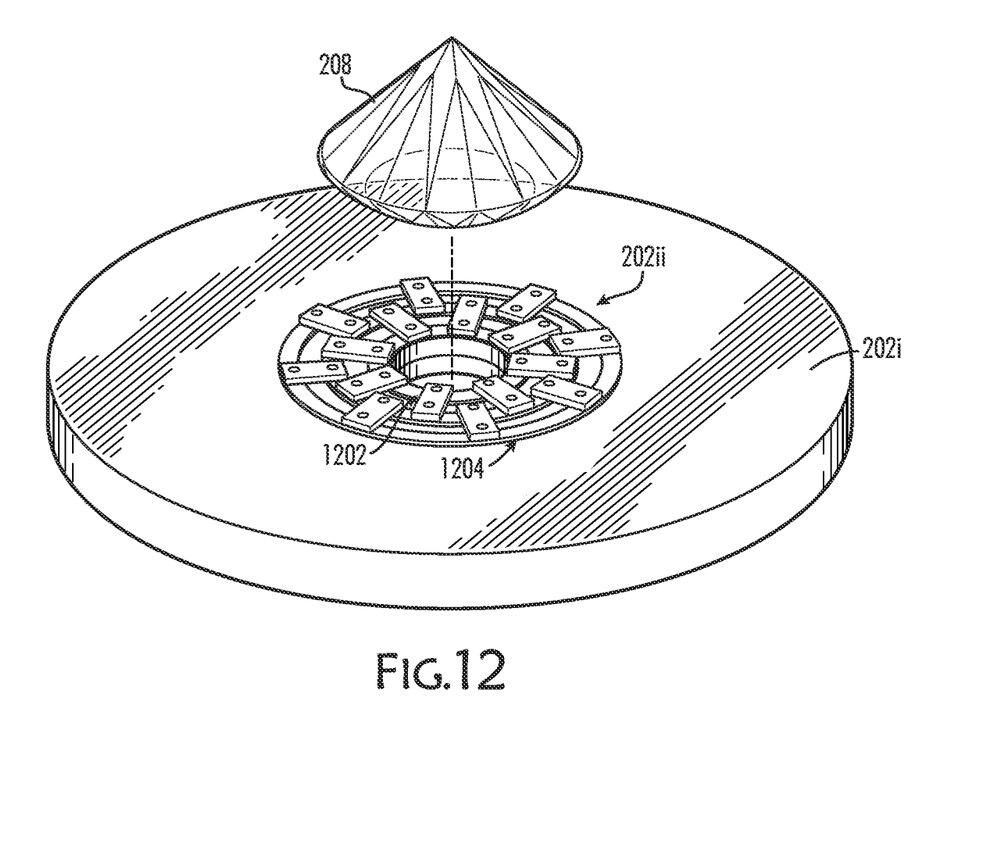

With respect to the lighting component 202ii, virtually any form of lighting could be used, alone or in combination, as long as the tag within the asset 208 is illuminated sufficiently for reading by the multi-function hardware 204. However, in an embodiment of the invention, LED lighting is used as the lighting component 202ii to take advantage of a number of benefits including luminosity, ease of control, low power consumption, small physical size per lumen, and others. The LED lighting is optionally configured as an array of a plurality of LEDs, wherein optionally, each LED is individually controllable or controllable in groups of LEDs to optimize the illumination of the tag. For example, different lighting settings/modes can be pre-programmed to control the LEDs individually and/or in groups and/or intensity and/or wavelength in order to provide optimal lighting presets. In some embodiments of the invention, the LEDs are arranged in at least one ring 1202 (shown in more detail in FIG. 12), wherein the holder 202i and/or the asset 208 is positioned at or near the center of the ring. Optionally, the LEDs are arranged in a compact plurality of rings 1202, 1204. In some embodiments of the invention, the lighting component 202ii is no larger than 10 mm in diameter. Optionally, the lighting component 202ii is no larger than 9 mm in diameter. Optionally, the lighting component 202ii is no larger than 5 mm in diameter. In an embodiment of the invention, the outermost ring 1204 is no larger than 9 mm in diameter. In some embodiments of the invention, the innermost ring 1202 is no larger than 6 mm in diameter.

In an embodiment of the invention, the combination of the asset 208 positioning within the holder 202i and the configuration and/or operational performance of the lighting 202ii introduces illumination into at least one of the top surface ("table") or surfaces of the asset, for example through the table of a cut gem, and the facets of the cut gem underlying the top surface. This illumination, in an embodiment of the invention, reflects off the back surfaces or facets of the asset and then is scattered in the forward direction by features of the tag. In some embodiments of the invention, the tags are made from a collection of micron sized dots that are written in the volume/body of the asset by precise focusing of a femtosecond laser. This process makes a very slight localized modification to the index of refraction of the asset which appear as dark spots when illuminated from below the dots. In an embodiment of the invention, this forward scatter of light permits ready viewing of the tag by the multi-function hardware 204 using contrast between the tag and the forward scattered light. In an embodiment of the invention, enough contrast is created so that the light scattered from the dots is not overwhelmed by light that is directly reflected from the surface of the asset. Optionally the lighting 202ii is integrated into the holder 202i.

With respect to the magnifying optics 202iii, the magnification is optionally selected to be compatible with a camera of the multi-function hardware 204 to produce a well-defined image of the tag on the multi-function hardware 204 image sensor (likely a CMOS sensor) or sensors (if more than one camera is used) when the asset 208 is positioned in the correct x/y/z location. In some embodiments of the invention, the magnifying optics 202ii are essentially a 200× fixed magnification microscope that has been packaged into a compact form factor. That is, if the multi-function hardware 204 is removed, and a human eye is placed in a position in lieu of the image sensor of the multi-function hardware 204, the image of the viewable tag would be what one would expect when looking through a 200× magnification microscope. In an embodiment of the invention, this overall 200× magnification is achieved by using a 20× magnification objective in combination with a 10× magnification eyepiece. The magnified image created by this arrangement is produced in the image plane of the multi-function hardware's 204 optical system. In some embodiments of the invention, the optical system of the multi-function hardware 204 then imparts a de-magnified version of this image onto the multi-function hardware's 204 image sensor. In some embodiments of the invention, the total magnification achieved to the CCD plane of the multi-function hardware 204 is 7× to 10×. In some embodiments of the invention, the multi-function hardware optics are used to supplement, form a part of and/or are used in lieu of the magnification objective and/or the eyepiece of the magnifying optics 202iii.

In an embodiment of the invention, the selected effective magnification of the magnifying optics 202iii is somewhat tied to the magnification used by certification laboratories for grading. More specifically, as is described in U.S. application Ser. No. 16/429,784, the tagging unit 102 etches tags into the body of an asset so that they are undetectable by industry standard grading/certification processes. In one scenario, this means that the tag is too small to be visible using a 10× or less magnification level. In this way, the tag does not affect the grade of the asset since it is imperceptible. Optionally, tags that are too small to be visible using 20× or less magnification, or even more magnification are imparted by the tagging unit 102, all of which are readable using the currently described system.

In some embodiments of the invention, the effective magnification is selected to sufficiently separate the dots in the tag. The magnification also impacts what a user will see on the screen of the multi-function hardware 204 during the imaging. In an embodiment of the invention, the magnification and field of view for both the needs of the multi-function hardware optics and for the needs of the human user are balanced by the effective magnification selection. This situation is shown in the images below for our current system with ~200× reader magnification With respect to the reflective optics 202iv located within the reader 202, generally a folded optical path is created to help optimize the reader 202 to a compact and easily-transportable size. In an embodiment of the invention, the illuminated image path within the reader 202 commences at the lighting 202ii, passes into the asset 208, then into the objective (which in some embodiments is 20× magnification), through a plurality of turning mirrors (shown and described in more detail with respect to FIG. 4), into the eyepiece (e.g. 10× magnification) and then into the optics of the multi-function hardware 204, for example the CMOS sensor of a mobile phone camera.

Figure 3:
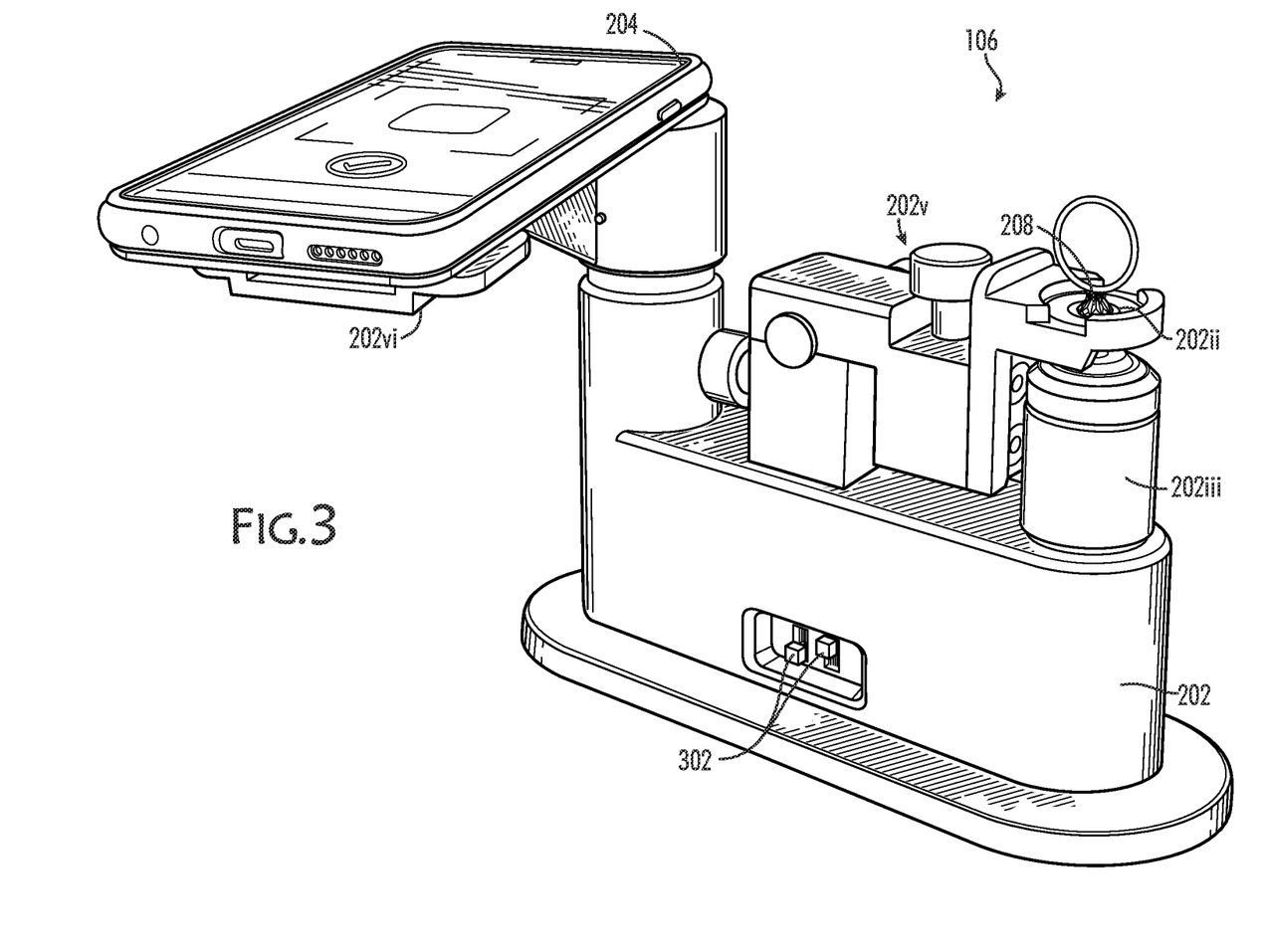
FIG. 3 is a perspective view of portions of an asset verification system, in accordance with an exemplary embodiment of the invention.
Figure 4:
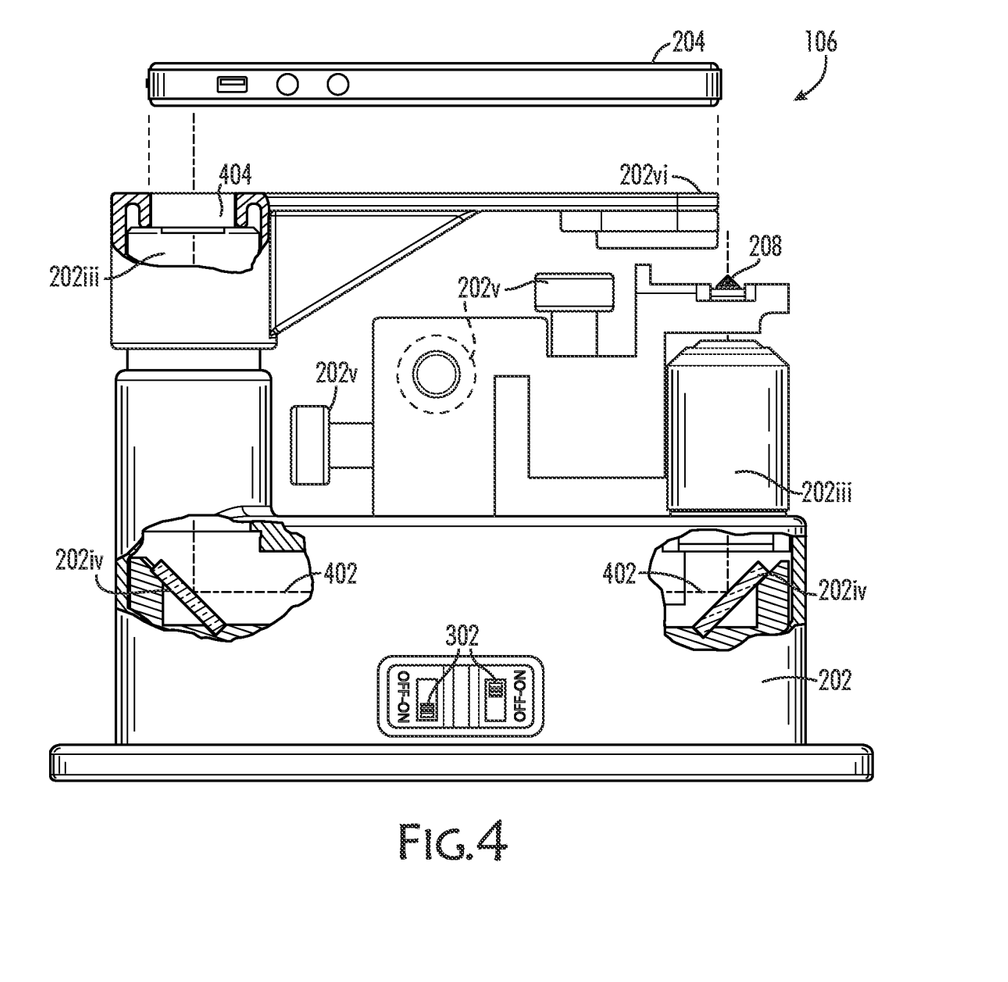
FIG. 4 is a rear view of portions of an asset verification system, in accordance with an exemplary embodiment of the invention.

With respect to the position controls 202v, there is optionally provided a positioning system to adjust the positioning of the asset 208 and/or holder 202i and/or lighting 202ii so that the tag is optimally viewable by the system 106. In some embodiments, the position controls 202v are manually operated, for example by axis controls such as shown in FIGS. 3 and 4, inter alia. In some embodiments, position control is automatic, for example being effectuated by a software-programmed controller in operative communication with the positioning system. The position controls 202v are configured to adjust the positioning of the asset 208 in at least one coordinate, for example in at least one of the x, y and/or z coordinates. Optionally, the position controls 202v also adjust orientation and/or rotation of the asset 208 with respect to the magnifying optics 202iii and/or reader 202. In some embodiments of the invention, the positioning system is comprised of extending gears and/or screw/threading and/or in combination with a spring loaded platform and/or using a piezo-electric actuator, however, these are just examples of what could be used to effectuate positioning. In some embodiments of the invention, the position controls 202v operate in synchrony with the optics of multi-function hardware 204 to optimize the viewing/reading of the tag.

In some embodiments of the invention, the field of view of the optics of the multi-function hardware 204 is maximized/optimized since a larger field of view will relax the need for precise positioning of the asset (tag within the asset) in order to put the tag in the field of view for reading of the tag. For a given sensor size, a larger field of view also means less magnification should be required. In an embodiment of the invention, zero or minimal digital zoom is used with images in order to maximize/optimize field of view, for example by implementing machine learning to recognize and/or decode tag images in this configuration.

In an embodiment of the invention, x/y adjustment and the precision of this adjustment is largely driven by: 1) the ability to design mechanical fixturing that datum the asset/tag centered to the optical path; and, 2) the field of view of the optical system. In some embodiments of the invention, the tag size and system magnification then determines how accurate the fixturing needs to be in order to eliminate the use of lateral positioning adjusters.

In some embodiments of the invention, a focus bracketing strategy is utilized to either compensate for z-coordinate positioning error and/or guide a manual, user-friendly focus adjustment process.

With respect to the device platform 202vi, this is used as a convenient holder for multi-function hardware 204 wherein the optic sensor of multi-function hardware 204 can be readily aligned with the image being projected from the asset 208. In an embodiment of the invention, the device platform 202vi includes an "eye" piece which provides a modicum of magnification, for example 10×, as described elsewhere herein. This eyepiece operates together with the objective of the magnifying optics 202iii to provide an effective magnification that is a product of the two. Optionally, the eyepiece is separate from the device platform 202vi (for example, the device platform 202vi is mounted on top of the eyepiece, wherein a cylinder of the device platform slips over a cylinder of the eyepiece), and is considered to be a sub-part of the magnifying optics 202iii. In an embodiment of the invention, the device platform 202vi is substantially flat to enable stable placement of a multi-function hardware 204 thereon. Optionally, the platform is especially formed to act as a counterpart to the shape of multi-function hardware 204, for example if the multi-function hardware 204 is not generally flat. In some embodiments of the invention, the device platform 202vi is moveable, for example is capable of rotation about one or more rotational axis (for example, as shown and described in more detail with respect to FIG. 8). In some embodiments of the invention, the reader 202 does not include a device platform 202vi.

In some embodiments, instead of a communications network being used automatically by the reader 202 or the multi-function hardware 204, the identification is optically and/or manually retrieved and entered into a user-interface, such as a website and/or through a web-based browser/interface, for verifying asset identification and/or retrieving related asset information.

In some embodiments, the asset verification system 106 is provided with a communications interface 206 for communication with a communications network, for example the Internet and/or a cellular network and/or a satellite network. Communication provided to the asset verification system 106 connects the system 106 to the distributed ledger 104 and/or some other information resource, optionally located within a remote and/or cloud-based information system.

FIG. 3 is a perspective view of an asset verification system 106, in accordance with an exemplary embodiment of the invention. In an embodiment of the invention, exemplary physical components corresponding to the schematic components of FIG. 2 are shown in the asset verification system 106 of FIG. 3. It should be understood that this one way to carry out the system 106 shown in FIG. 2, but that other physical configurations of the system 106 could be used. In the interests of brevity, FIG. 3 is described in conjunction with the flowchart 1100 of FIG. 11, which shows a method of using the asset verification system 106, in accordance with an exemplary embodiment of the invention. An asset 208 is placed (1102) in a holder and in a position where the lighting 202ii can penetrate the asset 208. The asset 208 is optionally moved (1104) using the position control 202v (shown in FIGS. 3 and 5 with each coordinate having its own dedicated control knob) in one or more axes and/or a lighting mode is selected (1106) to optimize the lighting incident upon the asset 208 based on the asset's configuration/size/shape. The tag within the asset 208 is revealed at least partly by being illuminated/contrasted by the lighting 202ii, the image of which is then magnified (1108) by the magnifying optics 202iii and reflected (1110) to the eyepiece by the reflective optics 202 iv (not shown) within the reader 202. A multi-function hardware 204 component, which is optionally disposed on the device platform 202vi reads (1112) the image reflected (1110) through the eyepiece using its optics (e.g. camera), for example, using an image sensor such as a CMOS sensor. The tag which is read (1112) by the multi-function hardware 204 is then processed (1114) by the hardware 204 and/or an external controller and then, using the communications interface 206, information is gathered (1116) about the asset 208 from the distributed ledger 104 and/or other information sources using the identification from the tag. The information gathered about the asset 208 is then optionally communicated back to the multi-function hardware 204 and is optionally displayed (1118) to a user on a display of the multi-function hardware 204.

In an embodiment of the invention, the reader 202 includes one or more switches 302, for example turning on the lighting 202ii, powering on and off the reader 202 (e.g. if the position controls 202v are automatic) and/or for activating the communications interface.

In some embodiments of the invention, the reader 202 is constructed in an easily hand-portable size ("easily" meaning transportable by one hand), for example being approximately 10-20 cm wide, 5-10 cm deep and 10-15 cm high. In some embodiments of the invention, the reader 202 is configured to be heavy enough to be stable when in use, but which is also "easily" transportable. Optionally, the reader 202 is 1-2 lbs in weight. Optionally, the reader is under 10 lbs. Optionally, the reader is under 5 lbs.

FIG. 4 is a rear view of portions of the asset verification system 106, in accordance with an exemplary embodiment of the invention. As described above, FIG. 4 has a partial cut-away of the reader 200 which shows some of the reflective mirrors which comprise the reflective optics 202iv of the reader 202 and which communicate the illuminated tag image from the asset 208 to the multi-function hardware 204 for identification/reading along a pathway 402 between both. Also shown in a cut-away view is the eyepiece 404 portion of the magnifying optics 202iii, in an embodiment of the invention. It should be understood that the pathway 402 of the illuminated tag image could assume any configuration, as long as the image of the tag is clearly communicated to the optics of the multi-function hardware 204. Therefore, the shown pathway 402 in FIG. 4 is by way of example only.

Figure 5:
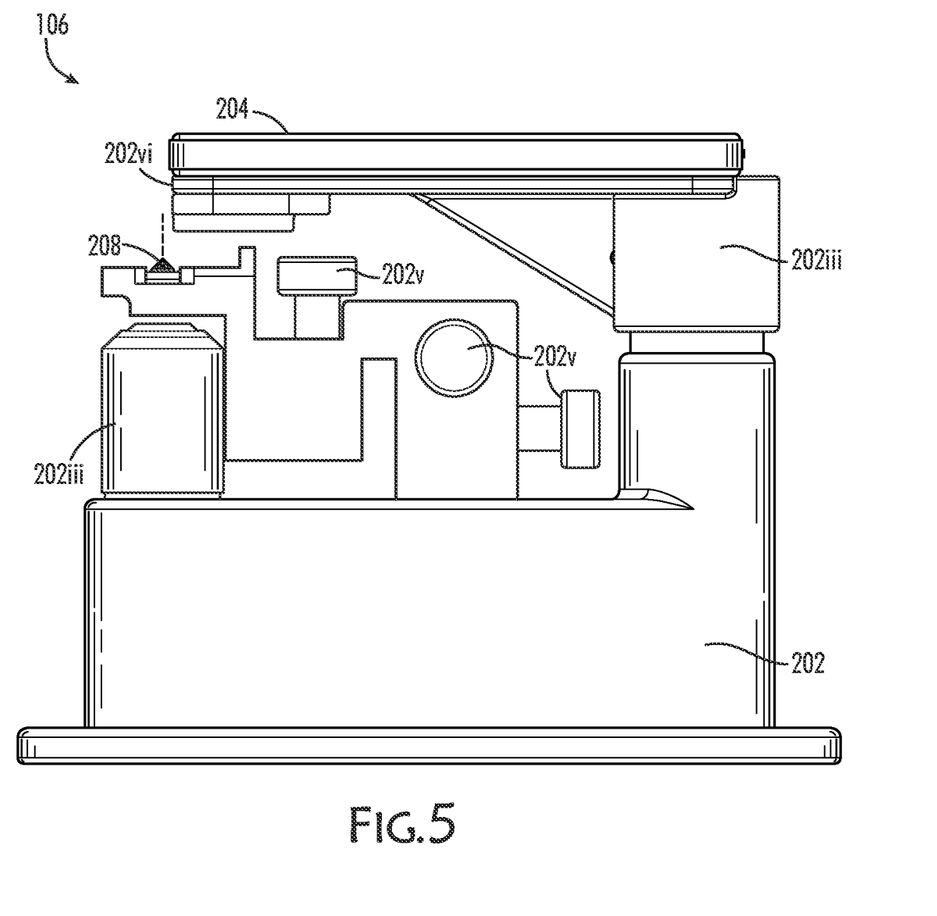
FIG. 5 is a front view of portions of an asset verification system, in accordance with an exemplary embodiment of the invention.
Figure 6:
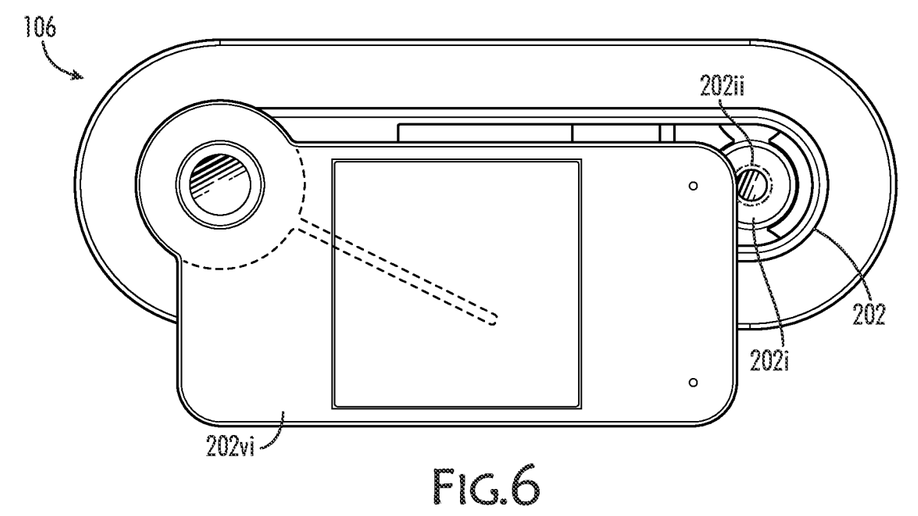
FIG. 6 is a top view of portions of an asset verification system, in accordance with an exemplary embodiment of the invention.
Figure 7:
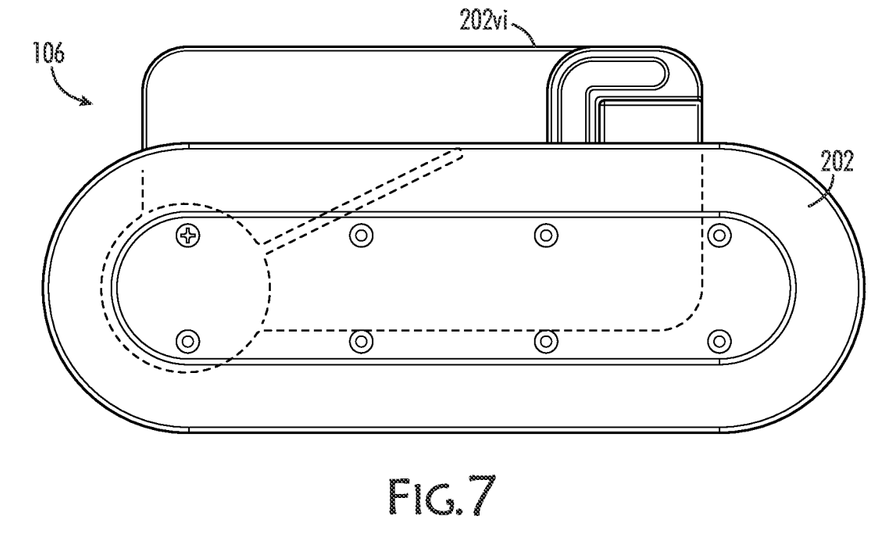
FIG. 7 is a bottom view of portions of an asset verification system, in accordance with an exemplary embodiment of the invention.

FIG. 5 is a front view of portions of the asset verification system 106, in accordance with an exemplary embodiment of the invention. FIG. 6 is a top view of portions of the asset verification system 106, in accordance with an exemplary embodiment of the invention. From this view, the lighting 202ii array can be seen more clearly, however, it should be understood that while only a single ring is shown, this is by way of example only. There could be more rings, more or less LEDs or other lights, and the lighting 202ii does not actually have to be arranged in a ring shape. FIG. 7 is a bottom view of portions of the asset verification system 106, in accordance with an exemplary embodiment of the invention.

Figure 8:
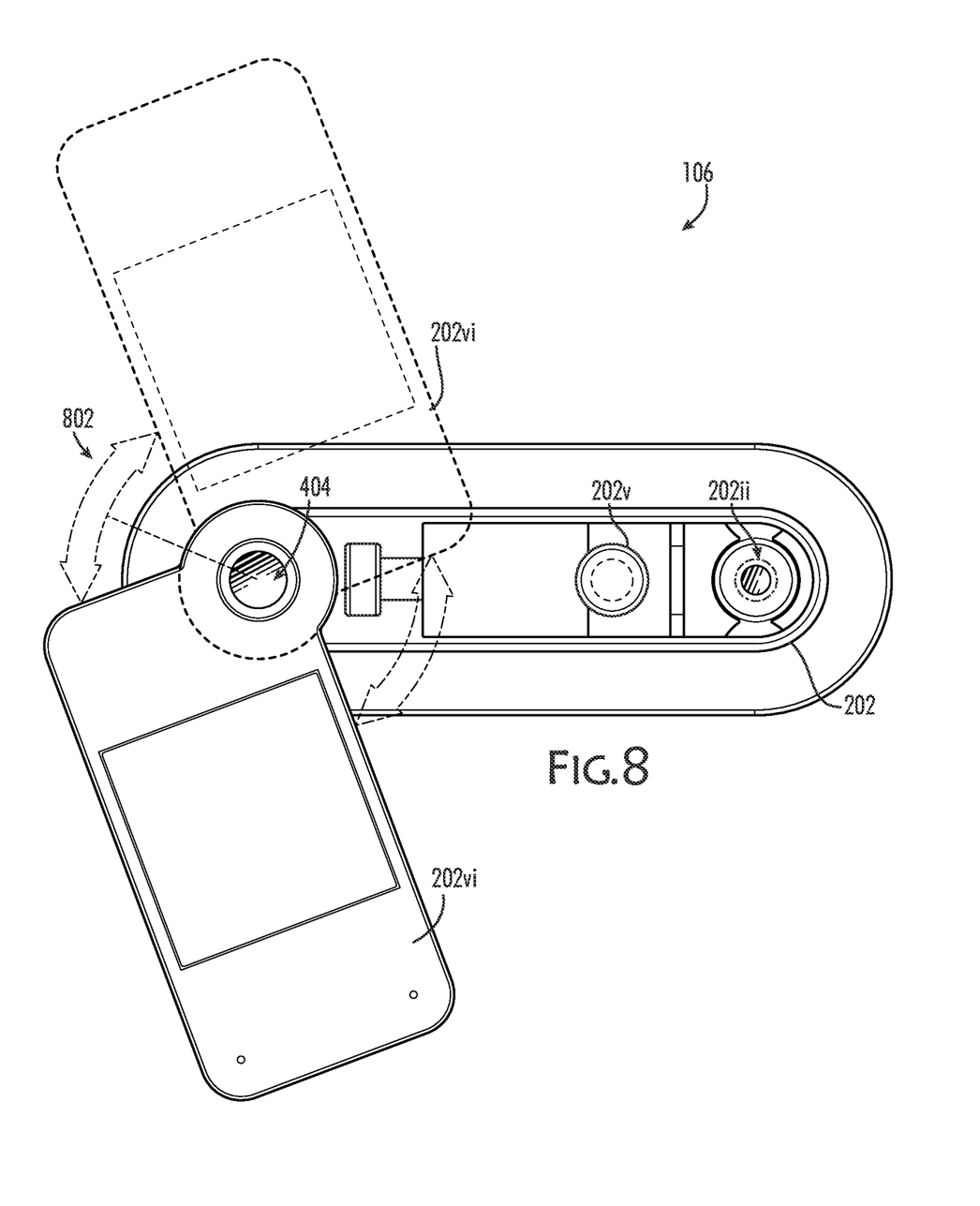
FIG. 8 is a top view of portions of an asset verification system showing the rotational ability of the mobile device holder, in accordance with an exemplary embodiment of the invention.

FIG. 8 is a top view of portions of the asset verification system 106 showing an exemplary rotational 802 ability of the device platform 202vi, in accordance with an exemplary embodiment of the invention. It should be understood that movement and/or articulation of the device platform 202vi could be achieved in more than one dimension, and that the device platform 202vi may be adjustable in size or interchangeable with different sized platforms to accommodate different sized multi-functional hardware 204.

Figure 9:
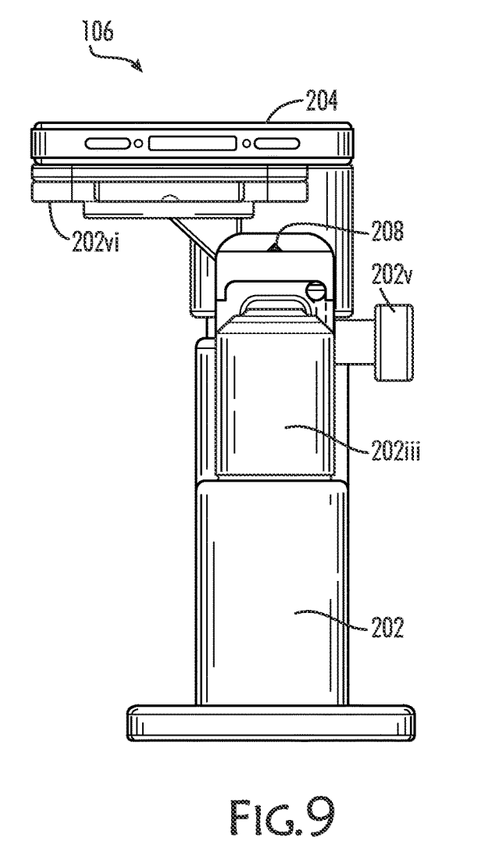
FIG. 9 is a left side view of portions of an asset verification system, in accordance with an exemplary embodiment of the invention.
Figure 10:
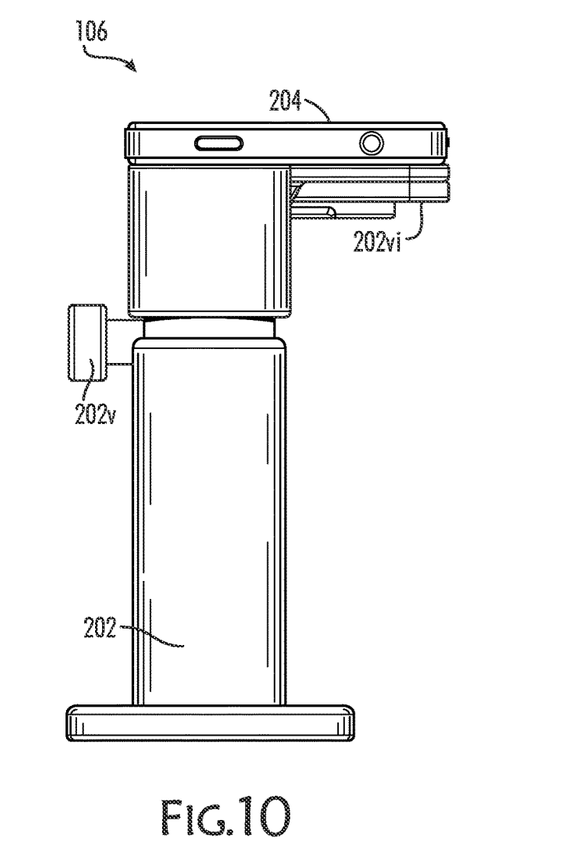
FIG. 10 is a right side view of portions of an asset verification system, in accordance with an exemplary embodiment of the invention.
Figure 11:
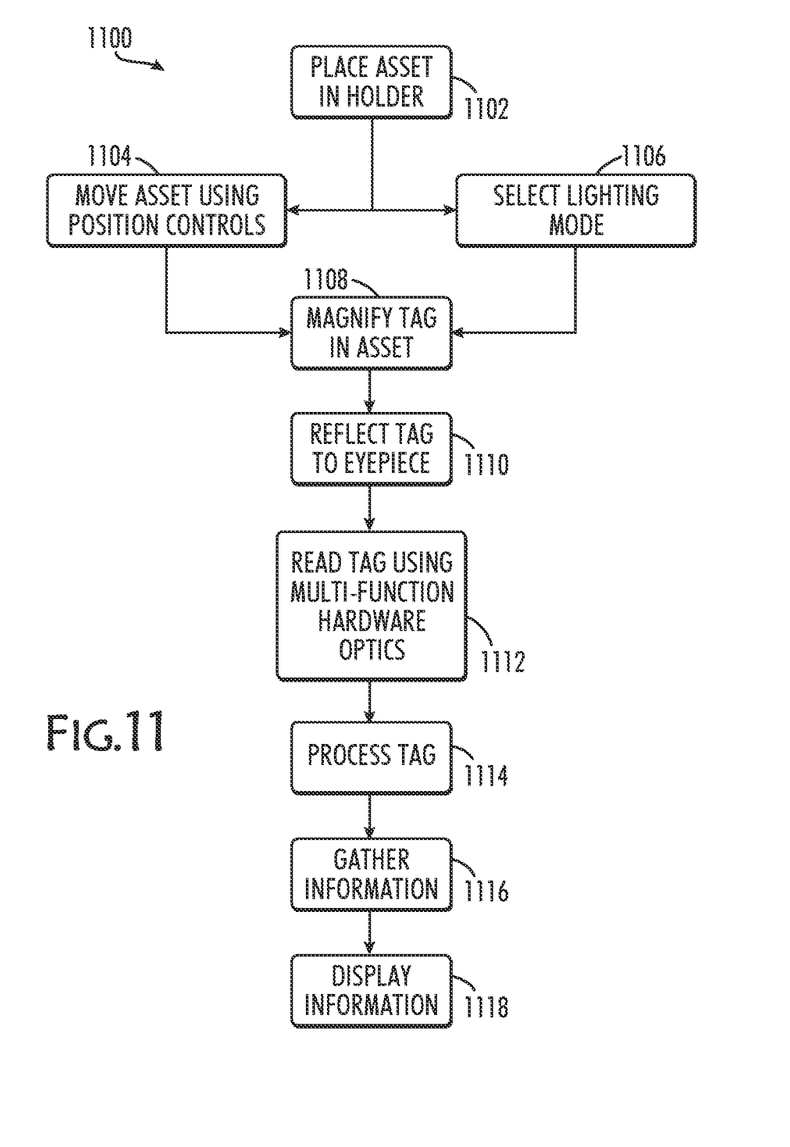
FIG. 11 is a flowchart of a method of using an asset verification system, in accordance with an exemplary embodiment of the invention; and, FIG. 12 is a schematic view of a lighting source, in accordance with an exemplary embodiment of the invention.

FIG. 9 is a left side view of portions of the asset verification system 106, in accordance with an exemplary embodiment of the invention, and FIG. 10 is a right side view of portions of the asset verification system, in accordance with an exemplary embodiment of the invention.

With respect to the software application installed on the multi-function hardware 204 referenced above and elsewhere herein, in some embodiments of the invention, image processing and/or positioning of the asset 208 and/or hardware 204 control is handled by the software and the multi-function hardware without communication to any remote servers and/or databases. In some embodiments of the invention, the tag is read without active user intervention, however, in some embodiments of the invention, image feedback could be provided to the user in order to help the user assist in the alignment process. For example, feedback could be presented to the user in an abstracted form—e.g. a screen assisting in lateral positioning might show a circle and large dot. The user would then be asked to move the dot to the center of the circle. For focus assistance the user would, for example, be asked to adjust until the dot size just fills the circle. In the background, the software would be capturing, processing, and updating the abstracted feedback to the user.

In some embodiments, the software selects which of multiple rear facing cameras to use for tag capture and disables one or more of the others. In some embodiments of the invention, the software controls processing of images and provides feedback to a user for placement of the multi-function hardware 204 on the reader 202, optionally the platform 202vi. In some embodiments of the invention, the software captures and evaluates images to determine if they contain a tag and if they are of sufficient quality to extract a tag with high accuracy. In some embodiments of the invention, the software processes images and provides feedback to the user to guide manual adjustments of asset 208 position, optionally using position controls 202v. In some embodiments of the invention, the software controls lower level camera exposure values to optimize images for tag recognition and extraction. In some embodiments of the invention, the software controls camera focus settings to optimize images for tag extraction. In some embodiments of the invention, the software controls use of the multi-function hardware camera's built in functions (such as e.g. noise reduction, HDR) to optimize for tag extraction. In some embodiments of the invention, the software extracts tag scale and orientation information from the alignment code. In some embodiments of the invention, the software extracts tag code hexadecimal value. In some embodiments of the invention, the software provides confidence metrics for tag accuracy. In some embodiments of the invention, the software displays generic and/or local general marketing information to the user. In some embodiments of the invention, the software instructs users through illustrations and animations on how to use the tag code reader. In some embodiments of the invention, the software communicates with business backend systems to manage things like e.g. onboarding, usage metrics, etc. In some embodiments of the invention, the software's UI shows an indicator that tells the user when the multi-function hardware 204 is viewing a useful tag image (e.g. red-light/green-light).

In some embodiments of the invention, the 'CameraPixels' app for the iPhone and the 'Open Camera' app for Android are used to disable the native photo modes and allow the software of the system 106, installed on the hardware 204, to have system 106 and/or manual control of the camera settings such as focus and exposure.

In a specific example, Python/OpenCV scripts (the software app) were used to extract tag codes from the tag images acquired with the reader 202. It should be understood that other programming languages will or may be used in future implementations and depending on hardware platforms running the software. With adequate images, the software extracted a tag code from tag images with any orientation and any scale with no user input. For noisy or low contrast images, the user adjusted the OpenCV blob detection parameters until only the tag blobs were detected and higher contrast or larger noise blobs were rejected. The tag blobs were then pre-processed comparing the detected patterns of the blobs for alignment and/or orientation of the tag, while then conducting further processing using the detected and pre-processed tag image to identify the actual tag identifier (e.g. nine digit hexadecimal number).

In another specific example, neural network based machine learning methods were applied to extract and decode tag codes from the tag images acquired with the reader 202. A set of training images is used to train a neural network which in turn learns to recognize and decode tags in a generalized data set. In some embodiments, a multi-stage neural network is employed with one stage trained to recognize if a tag is present in an image, one stage trained to determine the scale and orientation of the tag, and one stage trained to decode the tag value. In some embodiments, one or more stages of the neural network are a heatmap regression network. In some embodiments of the invention one or all of these neural network stages will run locally on the same multifunction hardware that is used to capture the tag image. In some embodiments of the invention one or all of these neural network stages will run on cloud based computing resources.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

The term "plurality" means "two or more".

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. An asset verification system, comprising:
   a reader comprising
      a holder configured to hold an asset in a tag-reading position,
      a light source consisting of at least one light to provide illumination to the asset,
      magnifying optics configured with an effective magnification for both sufficiently separating dots in a tag in the body of the asset and viewing the tag at an effective magnification greater than 10×,
      reflective optics for conveying an image of the tag through the reader, and,
      position controls for adjusting the positioning of the asset with respect to the magnifying optics;
   a multi-function hardware device comprising an optical sensor for reading the tag of the asset projected to the optical sensor by the reader, wherein the multi-function hardware device is at least one of a tablet, smartphone and a laptop computer; and,
   a database having information related to the asset including an association of the tag to the asset stored thereon.

2. The asset verification system according to claim 1, further comprising a device platform provided to the reader for placement of the multi-function hardware thereon.

3. The asset verification system according to claim 2, wherein the device platform is adjustable in at least one degree of freedom.

4. The asset verification system according to claim 1, wherein the database includes a distributed ledger.

5. The asset verification system according to claim 1, wherein the holder orients the asset top-down, towards the light source.

6. The asset verification system according to claim 1, wherein the holder is one of a plurality of interchangeable holders.

7. The asset verification system according to claim 1, wherein the light source comprises at least one LED.

8. The asset verification system according to claim 1, wherein the light source is an array of lights.

9. The asset verification system according to claim 8, wherein each light is individually controllable for at least one intensity/luminosity, wavelength, and on/off.

10. The asset verification system according to claim 1, wherein the light source has preset modes of operation.

11. The asset verification system according to claim 1, wherein the magnifying optics is a combination of at least two of a magnifying lens and an eyepiece and an optical sensor of the multi-function hardware.

12. The asset verification system according to claim 1, wherein the reflective optics cause the tag image to follow a folded optical path, which reduces the size of reader.

13. The asset verification system according to claim 1, wherein the size of reader is 10-20 cm wide, 5-10 cm deep and 10-15 cm high while weighing under 5 lbs.

14. The asset verification system according to claim 1, wherein the position controls are automatically controlled by a controller.

15. The asset verification system according to claim 1, wherein the asset is at least one of a gem, a transparent or translucent material, a polymer, a precious stone, a crystal, and a collectible.

16. A method for using an asset verification system, comprising:
   placing an asset in a holder of a reader comprising a holder configured to hold an asset in a tag-reading position and a light source consisting of at least one light to provide illumination to the asset;
   lighting the asset to cause forward scatter of light through a tag disposed in the body of the asset;
   magnifying the tag in the asset using magnifying optics configured with an effective magnification for both sufficiently separating dots in a tag in the body of the asset and viewing the tag at an effective magnification greater than 10×;
   reflecting an image of the tag to an eyepiece, using reflective optics for conveying an image of the tag through the reader;
   reading the tag using a multi-function hardware device comprising an optical sensor for reading the tag of the asset projected to the optical sensor the reader, wherein the multi-function hardware device is at least one of a tablet, smartphone and a laptop computer;
   processing the tag read by the multi-function hardware; and,
   gathering information about the asset using a linkage between the tag and the asset stored on a database having information related the asset including an association of the tag to the asset stored thereon.

17. The method according to claim 16, further comprising moving the asset relative to the magnifying optics using position controls for adjusting the positioning of the asset with respect to the magnifying optics.

18. The method according to claim 16, further comprising displaying the gathered information to a user.

19. An asset identification, registration, tracking and/or commercialization system, comprising:
   a tagging unit, configured for laser-etching a tag into a body of an asset, wherein the tag is a physical indicator of at least some information related to the asset;
   a distributed ledger configured to store at least some information related to the asset, including at least an association of the tag with the asset; and,
   a reading device comprising an asset verification system for reading the tag and conveying at least some information related to the asset comprising,
      a reader comprising a holder configured to hold an asset in a tag-reading position and a light source consisting of at least one light to provide illumination to the asset,
      magnifying optics configured with an effective magnification for both sufficiently separating dots in a tag in the body of the asset and viewing the tag at an effective magnification greater than 10×,
      reflective optics for conveying an image of the tag through the reader, and
      position controls for adjusting the positioning of the asset with respect to the magnifying optics;
   a multi-function hardware device comprising an optical sensor for reading the tag of the asset projected to the optical sensor by the reader, wherein the multi-function hardware device is at least one of a tablet, smartphone and a laptop computer; and,
   a database having information related to the asset including an association of the tag to the asset stored thereon.

* * * * *